United States Patent [19]
Faller

[11] 3,953,273
[45] Apr. 27, 1976

[54] PROCESS FOR FORMING VISUAL DISPLAY PACKAGES

[75] Inventor: Rudolph A. Faller, Edina, Minn.

[73] Assignee: Hoerner Waldorf Corporation, St. Paul, Minn.

[22] Filed: Oct. 15, 1974

[21] Appl. No.: 514,498

Related U.S. Application Data

[62] Division of Ser. No. 451,019, March 14, 1974, Pat. No. 3,920,371.

[52] U.S. Cl. ............................. 156/224; 156/108; 156/245; 156/285; 206/463; 264/92; 425/388
[51] Int. Cl.² ......................................... B29C 17/04
[58] Field of Search ................. 264/89, 90, 92, 93, 264/248, 265, 266; 156/224, 245, 285, 108; 425/388; 53/30 R, 30 S, 184; 206/461–463, 471

[56] References Cited
UNITED STATES PATENTS

| | | | |
|---|---|---|---|
| 2,959,812 | 11/1960 | Allen | 264/98 X |
| 3,195,284 | 7/1965 | Crane, Jr. | 53/184 X |

FOREIGN PATENTS OR APPLICATIONS

| | | | |
|---|---|---|---|
| 1,454,267 | 9/1966 | France | 206/461 |

*Primary Examiner*—Jan H. Silbaugh
*Attorney, Agent, or Firm*—Jerry F. Best

[57] ABSTRACT

Method for forming visual display packages from blanks in which a plastic film covers a window region in the package, and in which a tab formed as part of the blank extends into the window region to support an article to be contained in the package and serve as a location for product codes and symbols or other information. At least one pocket is formed in the plastic film to receive an article prior to closing the package. The tab is rotated outward, and when the tab is located adjacent to the transverse axis fold line of the blank it assists in making the completed package freestanding. The tab may be bonded to a portion of the plastic film by a heat responsive thermo-plastic coating on the tab.

7 Claims, 21 Drawing Figures

PROCESS FOR FORMING VISUAL DISPLAY PACKAGES

This is a division, of application Ser. No. 451,019, filed Mar. 14, 1974 now Pat. No. 3,920,371.

REFERENCE TO RELATED APPLICATIONS

This application discloses process and apparatus used to form packages from blanks, the structures of which are disclosed and claimed in co-pending U.S. patent application Ser. No. 374,925, filed June 29, 1973 in the name of Rudolph A. Faller now U.S. Pat. No. 3,908,826, the subject matter of said co-pending application being explicitly incorporated by reference thereto.

BACKGROUND OF THE INVENTION

1. Field of the Invention

This invention relates to a process for forming containers from packaging card blanks of the type in which a clear plastic film is used in combination with a window opening in the card blank to provide a visual display of the article in the container, and in which at least a base section is provided for article support and as a region for applying product codes and symbols or other information.

2. Brief Description of the Prior Art

Numerous types of visual display packages are known, as disclosed in U.S. Pat. Nos. 3,221,473; 3,075,329; 3,018,879; and 3,185,295. Typical processes and apparatus for forming these display containers and packages are disclosed in U.S. Pat. Nos. 3,064,402; 3,018,879; 3,376,691; 3.075,330; and 3,075,329. The '879 Patent issued to Crane is of the type having a card blank with an aperture therein through which is formed a pocket in a plastic sheet lying on the opposite side of the blank. In most instances the opening in the blank is smaller than the article which is to be contained therein, and the film is heat-shrunk around the article after it is loaded into the package. The '295 Patent to Crane illustrates the use of a card which is folded about a center axis and which also employs the use of the heat-shrink film to enclose an article, wherein the base of the article forms the base of the stand-up package. Again, in this type of package, the film is shrunk about the article to form a tight package. These and other package styles found in the prior art are not readily adaptable to articles which, by themselves, are not capable of standing erect. Further, these packages do not provide areas to which a product code or symbol such as described in this invention may be located.

SUMMARY OF THE INVENTION

Method for forming a visual display container wherein a novel packaging card blank is used which has a window opening formed therein and has a platform section also formed in said card blank which extends into the window opening and is adapted to be rotated to become an exterior portion of the container. A plastic film is used to overlie the window opening and is formed through the window opening to create a recessed pocket for receiving an article to be packaged in the container. During the process of forming the recessed pocket, the platform section in the card blank is rotated to lie adjacent to the recessed area and on the outside of the recessed pocket. This portion of the container may then be used to provide support for the entire package if it is located at the bottom of the package and regardless of its location may be used to locate product codes or symbols or any other information.

DESCRIPTION OF THE PREFERRED EMBODIMENTS

It should be initially understood that the basic subject matter of this invention relates to the packaging of articles or objects and the formation of the containers from which those packages are erected by equipment and apparatus which are in wide spread use at this time. Since various types of commercially available apparatus may be adapted to incorporate this invention in order to produce the improved containers described in the above mentioned co-pending application, this description will include embodiments which may be used with the various popular types of equipment currently available. For example the basic apparatus disclosed in U.S. Pat. No. 3,075,330 to Swezey or the apparatus disclosed in U.S. Pat. No. 3,075,329 to Swezey et al may be used. Other types of apparatus will be specifically pointed out where applicable in the description below.

In general, the apparatus and method disclosed involves the manufacture of packaging components of the type wherein a blank is employed typically made from paperboard sheetlike material or other similar material. The card blank is formed with an opening therein and this opening is covered with a transparent plastic film or equivalent member which is formable and may be stretchable and shrinkable as well.

After a pocket is formed in the film, the article to be packaged is placed in the pocket and the container is sealed. Where a suitable plastic film is used this package may then be subjected to a selective application of heat to shrink the member into close contact with the article contained in the package. In the above mentioned copending application, an improved style of package and container has been disclosed.

Figure 1:
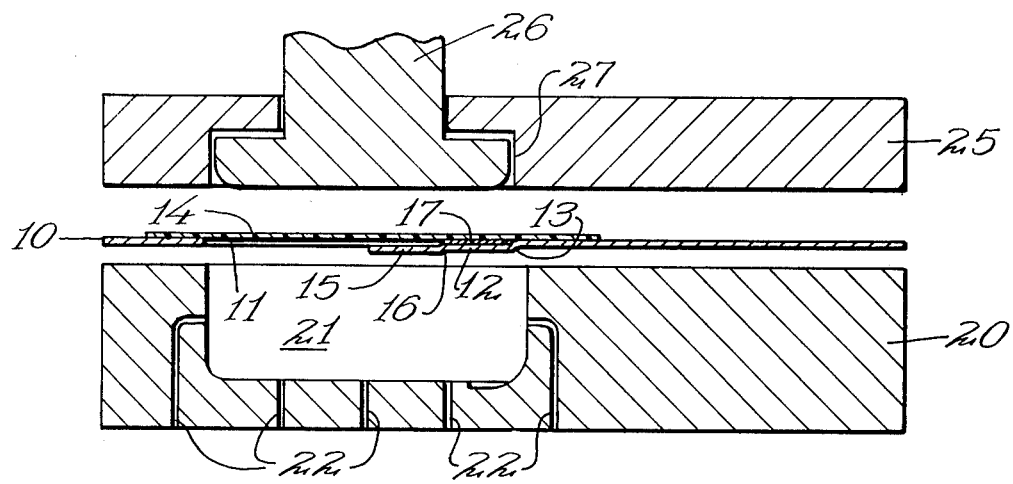
FIG. 1 is a sectional elevational view of a packaging card blank and apparatus embodying the present invention shown prior to actuating the apparatus and separated for clarity.

As can be seen in FIG. 1 in which the components are separated and enlarged for easier understanding and clarity, a packaging card blank 10 is shown, typically made from a relatively stiff, foldable or bendable sheetlike member or card. This particular type of card blank has a single window opening formed therein, generally designated as reference material 11. A platform section shown as 12, which is formed in said card blank and extends into the window opening area 10, and is designated as 12, and is attached to the card blank along a score line or similar connection shown as 13, which allows the platform section 12 to be rotated during the forming process.

A sheet of plastic film 14 is used to cover the window opening 11 and the rotatable platform section 12 in the card blank 10. The plastic film 14 may be held in place on the card blank 10 by any suitable means prior to processing the card blank. One common method of holding the plastic film 14 to the card blank 10 is the use of adhesive coatings in the areas adjacent to the window opening 11 in the card blank 10.

The packaging card blank 10 is disposed above a first platen 20 which has an opening formed in the top thereof directly adjacent to the window opening 11 in the card blank 10. In the particular embodiment illustrated by FIGS. 1, 2 and 3, a pocket forming region 21 is formed in the first platen 20. As will be described later, this pocket-forming region 21 may be formed in a separate member and disposed directly adjacent to the opening in the first platen 20. The pocket-forming region 21 may be adapted to include air passages shown as 22 which may be connected to a means for creating a vacuum and thereby create a vacuum in the pocket-forming region 21. The means for creating the vacuum is not shown, but may be any common venturi arrangement or vacuum pump.

Located directly above the first platen 20 is a second platen 25, which is adapted to be brought into registry with the first platen 20, and hold the card blank 10 in position during the forming process. If a vacuum process is to be used then the registry of platens 20 and 25 must be tight enough to achieve an essentially air-tight seal around the window opening 11 and the card blank 10. This can be accomplished by close machining tolerances of the two platens or by the use of a conventional gasket arrangement which is not shown in FIG. 1.

Also shown in FIG. 1 is a plunger 26 which is adapted to fit into a recess 27 in the second platen 25. The plunger 26 is adapted to be moved up and down by apparatus not shown and thereby acts as a primary forming member and the container forming apparatus.

Figure 2:
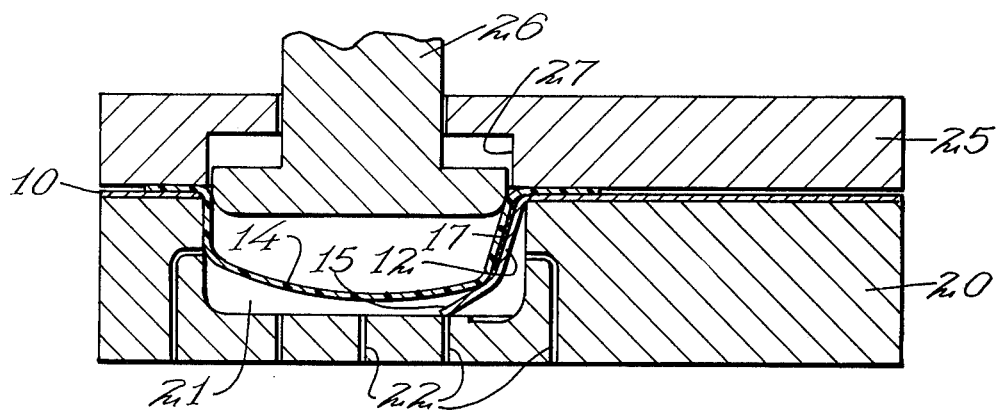
FIG. 2 is a schematic illustration a sectional elevational view of the card blank and apparatus of FIG. 1, shown during the forming process.
Figure 3:
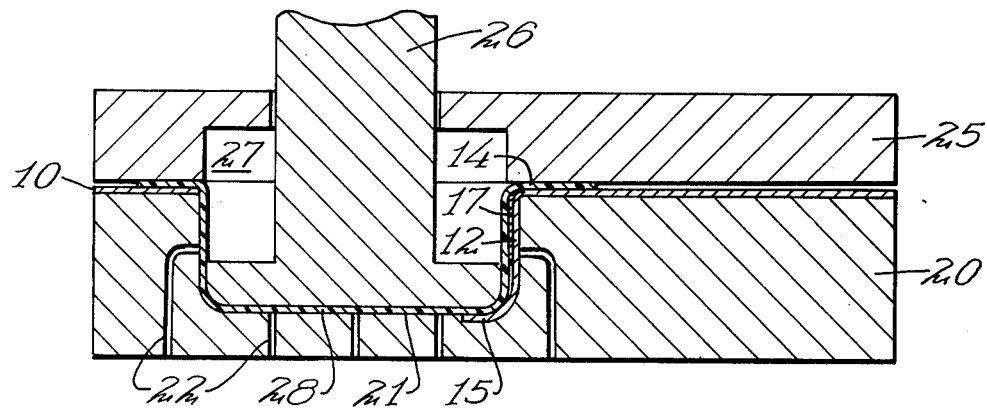
FIG. 3 is a schematic illustration of a sectional elevational view of the card blank and apparatus of FIG. 1, shown in the final forming position.
Figure 4:
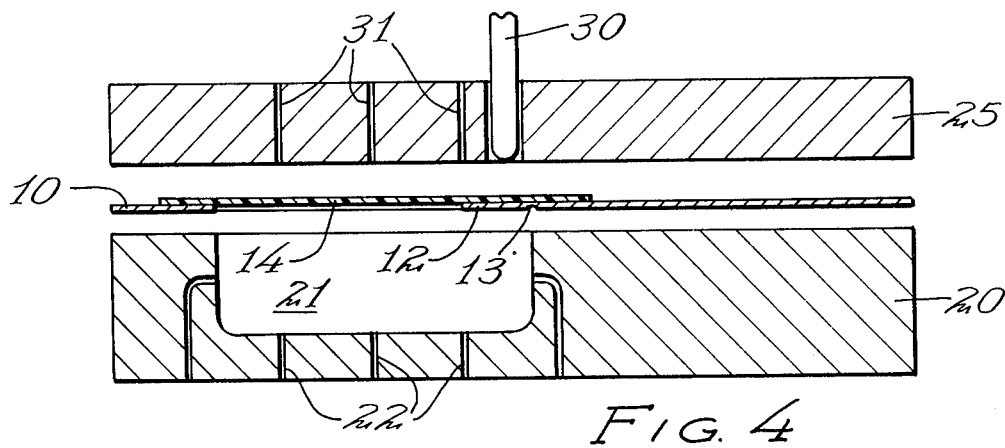
FIG. 4 is a schematic illustration of a sectional elevational view of a packaging card blank and apparatus showing an alternative embodiment of the present invention, and shown prior to actuating the apparatus and separated for clarity.
Figure 5:
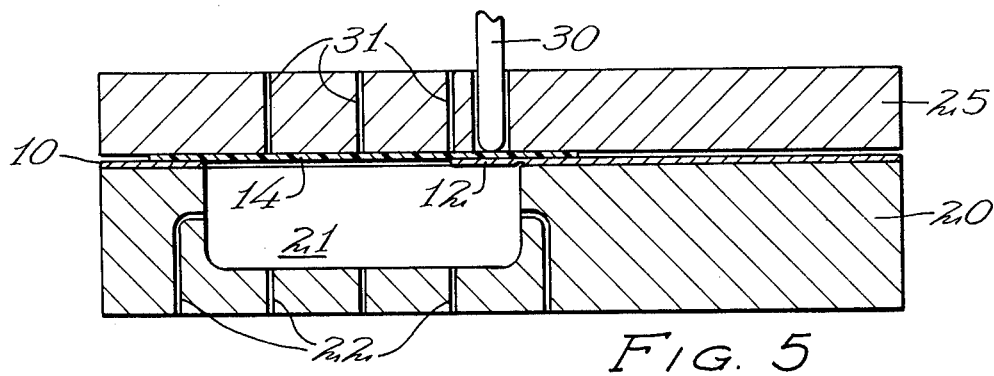
FIG. 5 is a schematic illustration of the sectional elevational view of the packaging card blank and apparatus of FIG. 4 shown just prior to actuating the apparatus.
Figure 6:
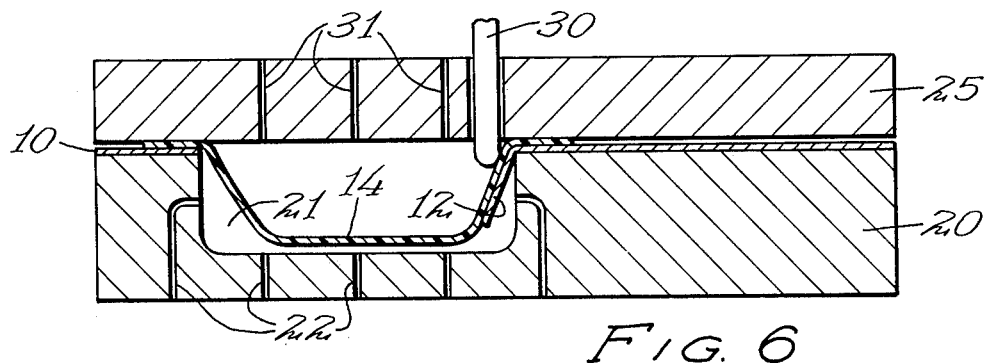
FIG. 6 is a schematic illustration of the sectional elevational view of a packaging card blank and apparatus of FIG. 4 shown during the forming process.

FIGS. 1, 2 and 3 illustrate sequential steps in the formation of a visual display container. It should be understood that the apparatus as disclosed in FIG. 1 may be employed without using the plunger 26. This vacuum form arrangement with a single pocket-forming region could be employed in a system such as the model SL-30 packaging system by Impak Systems Division of United States Machinery Corporation. The plastic film 14 which would be used in such a vacuum operation would generally be the plasticized variety which upon pre-heating becomes flexible and stretchable and would be capable of being vacuum formed.

The film would stretch and be expanded into the pocket-forming region 21 as shown in FIGS. 1, 2 and 3 without the action of the plunger 26. While there would be variables to be controlled such as temperature, elasticity of the film 14, and the amount of vacuum to be applied to the pocket-forming region 21, nevertheless the rotatable platform section 12 of the card blank 10 would be rotated down and into the pocket-forming region 21 as the film 14 is expanded. The rotatable platform section 12 would rotate about the score line 13 and in its final position would be nearly flush in a position perpendicular to the remainder of the card blank 10 and juxtaposed between a portion of the plastic film 14 and the side wall of the first platen 20.

FIGS. 1, 2 and 3 illustrate a variation of rotatable platform section 12 which has an extension or tab 15 adapted to be moved along with the remainder of the rotatable platform section 12 to be finally positioned on the front of the final expanded window area of the container. This additional tab 15 is connected to the remainder of the rotatable platform section 12 along an additional fold line 16. It should be understood that the shape and size of the rotatable platform section 12 and/or 15 may be varied to suit individual taste. Further, multiple rotatable platforms sections, not shown, may be brought down from more than one side of the window area 11.

It would be desirable to use the plunger 26 in those situations where it is necessary to use a non-plasticized film which, when heated, would not tend to expand as quickly and completely as desired by the action of the vacuum alone. Further, it may be found that to completely expand the plastic film 14 into the pocket-forming region 21 that it may be necessary to firmly and positively move the rotatable platform section 13 into juxtaposition with the side wall of the first platen 20. As can be seen in FIGS. 1, 2 and 3, it may be the case that some of the vacuum holes 22 leading to the pocket-forming region 21 in the first platen 20 would be covered by the rotatable platform section 12 thereby shutting off part of the vacuum and resulting in an incomplete forming process. FIGS. 1, 2 and 3 clearly illustrate how the action of the plunger 26 either by itself or in conjunction with an application of vacuum to the pocket-forming region 21 would result in the final product. Vacuum may, of course, be used alone.

It may also be useful to employ the plunger 26 to assure a fusion bond between areas of the rotatable platform section 12 and the areas of the plastic film contiguous thereto, where a thermoplastic coating has been applied to areas on the rotatable platform section 12. This bonding may be desirable to assure prevention of removal of the rotatable platform section 12 once the container is closed and in the market place. In FIGS. 1 through 3, a layer of thermo-plastic coating is shown by reference numeral 17, underlying a portion of the platform section 12. The extent of the area covered may of course, be varied for individual applications. Alternatively, an ionomer film may be used which will bond to a surface such as paperboard without the use of adhesives. This fusion bond may be obtained by the combination of heat and pressure between the film and paperboard surfaces.

Persons skilled in the art will be aware of available apparatus to be used in actuating the plunger mechanism 26 as well as the apparatus necessary to automatically load card blanks into the apparatus, heat the plastic film 14, as well as further steps including loading the article into the recessed pockets 28 in the completed container.

FIGS. 4, 5, 6 and 7 illustrate an alternative embodiment of the invention which may be used in those instances where the plasticized film will be capable of being deflected sufficiently by the vacuum to substantially form the required pocket, but where some mechanical force is required to assure proper positioning of the rotatable platform section 12 in the platen 20. For ease and understanding the invention and clarity, the reference numbers for the various components of the apparatus described will be carried throughout the various drawings.

It can be seen that each of the FIGS. 4, 5, 6 and 7 show the first platen 20 as well as the second platen 25 in the embodiment. In the embodiment shown in FIGS. 4, through 7 the full dimension plunger shown as 26 in FIGS. 1 through 3 has been replaced with a plug assist means shown as 30. As in the embodiments of FIGS. 1 through 3, passages for creating a vacuum in the pocket-forming region 21 are provided and shown as 22, and in addition, positive air pressure holes are shown in the second platen 25 and designated as 31 which may be employed to assist in the formation of the recessed pocket 28 and the plastic film 14.

In FIGS. 4 through 7 the packaging card blank 10 is shown with a single rotatable platform section 12 about a score line hinge 13.

It should be understood that the operation of the plug assist means 30 may be actuated sequentially following the initiation of the vacuum within the pocket-forming region 21, or it may be simultaneous therewith, or finally the plug assist means 30 may be positioned in extended manner from the second platen 25 and engage the plastic film 14 as the top or second platen 25 is lowered into registry with the lower platen 20. The actuation of the plug assist means 30 may be by conventional apparatus not shown in this disclosure.

Figure 7:
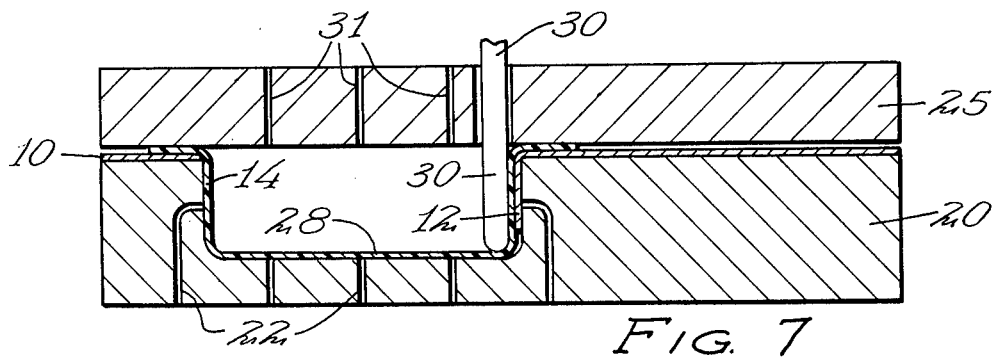
FIG. 7 is a schematic illustration of the sectional elevational view of a packaging card blank and apparatus of FIG. 4 shown at the completion of the forming process.

As with the earlier embodiment showing a full dimension plunger 26, the use of the plug assist means 30 may be combined with selective heat application to form a bond between the rotatable platform section 12 when it is coated with a thermo-plastic coating and that portion of the plastic film 14 lying contiguous thereto. As can be seen in FIG. 7, the use of the plug assist means 30 insures intimate contact between the rotatable platform section 12 and its contiguous section in the platic film 14. This combination does not result in unnecessary thinning or stretching of the plastic film 14 as may tend to occur with the full dimension plunger 26, since in the embodiment shown in FIGS. 4 through 7 the primary source of expansion is the vaccum and/or positive air pressure created through the air passages 22 and 31 in the upper and lower platens 25 and 20.

Packaging card blanks 10 of the type disclosed in FIGS. 1 through 7 having a single recess pocket 28 may be closed by folding the remainder of the card blank 10 over the back portion of the container and window opening 11, or by adding a second sheet of material over at least the window opening of the card blank 10. As previously mentioned, this loading and sealing process as well as any folding steps may be done either manually or by conventional packaging apparatus.

Figure 8:
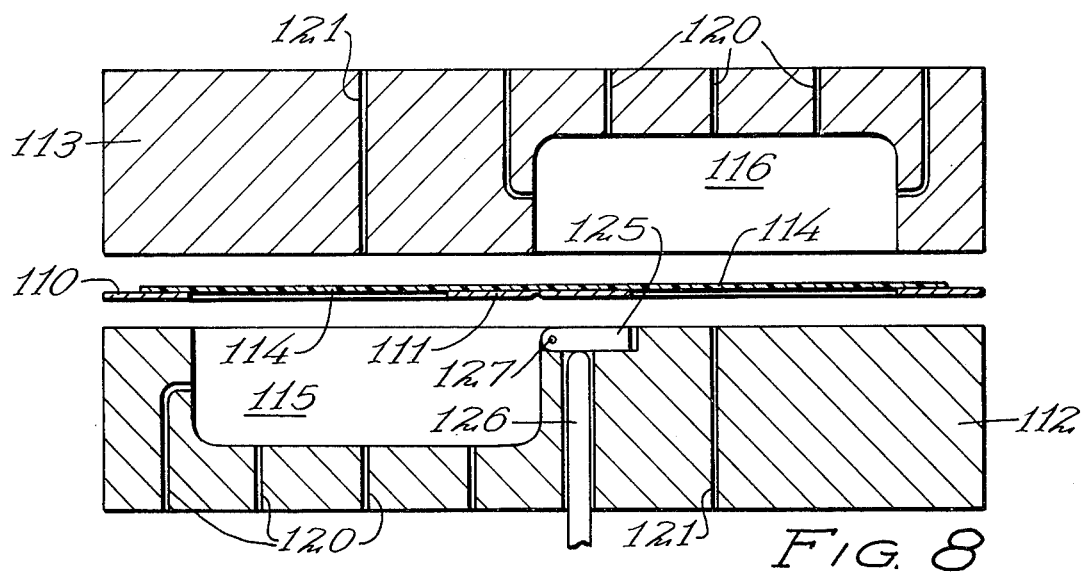
FIG. 8 is a schematic illustration of a sectional elevational view of a packaging card blank having two window openings and apparatus embodying the present invention shown prior to actuating the apparatus and separated for clarity.
Figure 9:
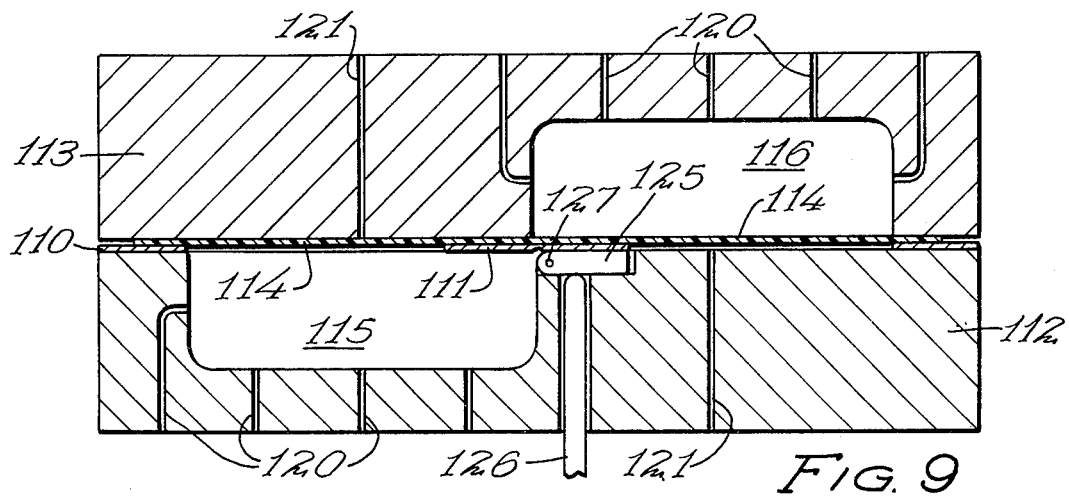
FIG. 9 is a schematic illustration of the sectional elevational view of a packaging card blank having two window openings and apparatus of FIG. 8 shown just prior to actuating the apparatus.
Figure 10:
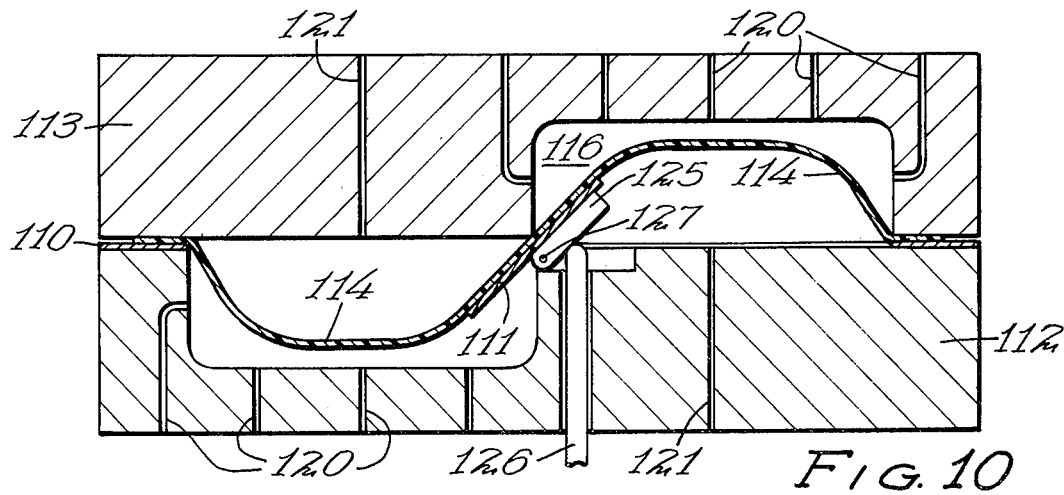
FIG. 10 is a schematic sectional elevational view of a packaging card blank having two window openings and apparatus of FIG. 8 shown during the forming process.

FIG. 8 shows in separated schematic fashion, a cross section of a packaging card blank 110 having two window openings wherein the window openings are disposed so that in completed form, the recessed pockets will be on opposite sides of the packaging card blank 110. The reason for this positioning of the recessed pockets is to allow the formation of the container with a rotatable platform section 111 which underlies at least a portion of the bottom extremity of both halves of the finished package having recessed pockets therein. The folding of the completed container will be described later. As in the previous examples, a pair of opposed forming members are used, including a first platen 112 which is, as seen in FIGS. 9 and 10, used as a support for the card blank 110. A second platen 113 is disposed directly above the first platen 112 and is adapted to be moved into registry with the first platen 112 by conventional means not shown and thereby hold the packaging card blank 110 in position during the forming process.

In FIGS. 8, 9 and 10 the first and second platens 112 and 113 respectively are shown with lower and upper pocket forming regions 115 and 116. Although it has not been illustrated, it should be understood that in the event a film is used which would be adapted to be press-formed, a dual arrangement of fully dimensioned plungers such as plunger 26 shown in FIG. 1 could be used to form the two recessed areas into the pocket-forming regions 115 and 116 in the arrangement shown in FIGS. 8, 9 and 10. Similarly, it may be discovered that for a given set of circumstances, the action of applying a vacuum to the two pocket-forming regions 115 and 116 either alone, in combination with the application of positive air pressure to those areas, or in combination with one or more plugs or plungers would be sufficient to form the plastic film designated as 114 in FIGS. 8, 9 and 10 into substantial conformity with the pocketforming regions 115 and 116. For that reason, the first platen 112 and second platen 113 have been shown with passages for vacuum and positive air pressure and are designated as 120 for vacuum passages and 121 for positive air passages respectively.

In the formation process as shown in FIGS. 9 and 10, it should be noted that as the film 114 is drawn down and into the lower pocket-forming region 115 in the first platen 112, irrespective of whether the film 114 is expanded by means of positive air pressure, vacuum, or a mechanical application of force, the film 114 moves and rotates the rotatable platform section 111 ahead of it. Conversely, in the expansion of the plastic film 114 into the upper pocket-forming region 116 in the second platen 113, the plastic film 114 moves into the pocket-forming region 116 ahead of that portion of the rotatable platform section 111 contiguous thereto. It should therefore be noted that if the portion of the plastic film 114 which is being expanded into the lower pocket-forming region 115 advances ahead of that portion of the plastic film 114 being expanded into the upper pocket-forming region 116 it is possible to create a bending moment within the rotatable platform section 111 and cause damage thereto in the form of bending or kinking at approximately its midpoint.

To prevent damage to the rotatable platform section 111, the formation of the upper and lower recessed pocket in the plastic film 114 may be accomplished sequentially, wherein the upper pocket is formed ahead of the lower pocket so that the plastic film 114 moves ahead of and is not a restriction against that portion of the rotatable platform section 111 which is to be moved into the upper pocketforming region 116. In other words, if vacuum is to be used to form the two pockets, the vacuum could be directed to the upper pocketforming region 116 prior to the application of the vacuum to the lower pocket-forming region 115.

It may be found, however, that to accomplish satisfactory production speeds, the necessary delay required to accomplish this relief of pressure on the upper portion of the rotatable platform section 111, would be too great. It may, therefore, be desirable to use a rotatable platform support member, shown as 125, which would be rotated upwards to provide support for that portion of the rotatable section 111 most likely to be under the stress of a bending moment. This rotatable platform support member 125 is shown built into the first platen 112 and lying flush with the top thereof. An alternative configuration for the rotatable platform support member 125, wherein the support member 125 is adapted to underlie a greater portion of the rotatable platform section 111 will be described later.

In the embodiment as shown in FIGS. 8 through 10, means for rotating the support member 125 are provided to insure adequate support for the platform section 111 during the entire forming process. This means for rotating the support member 125 is shown as a piston rod 126 which can be moved upwards to engage the rotatable platform support member 125 and move the entire assembly vertically into position in the upper pocket-forming region 116 about a pivot point 127. The driving force behind the rotating means 126 is not shown, but may be any conventional mechanical apparatus. It should be understood that the rotating means 126 and platform support member 125 may serve a dual purpose in not only assuring that no damage will occur to the rotatable platform section 111, but in addition making certain that the final portion of the rotatable platform section will be as desired within the upper pocket forming region 116, even though one or more of the vacuum passages 120 may be closed off by the expanded film 114.

An illustration of the variety of combinations which may be employed within the scope of this invention would be the use of a member in the embodiment shown in FIGS. 8, 9, and 10 to perform the same function as the rotating means 126, only designed as well to act as a full dimension plunger to assist in forming a recessed pocket in the film. This member would serve to form the pocket on one side and move rotatable platform support member, while some other means such as vacuum was used on the other side.

Figure 11:
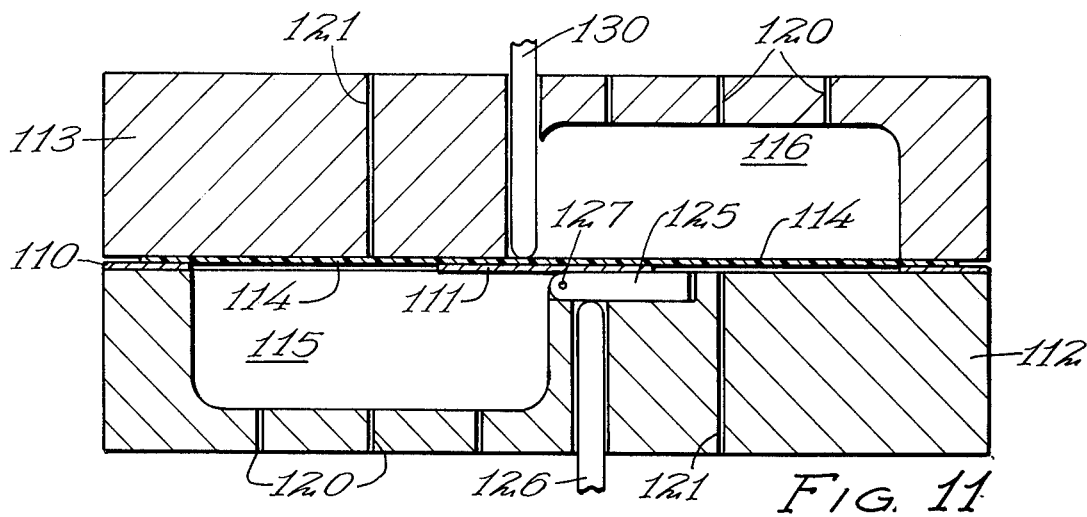
FIG. 11 is a schematic illustration of a sectional elevational view of a two window card blank and alternative apparatus embodying the present invention positioned just prior to actuating the apparatus.
Figure 12:
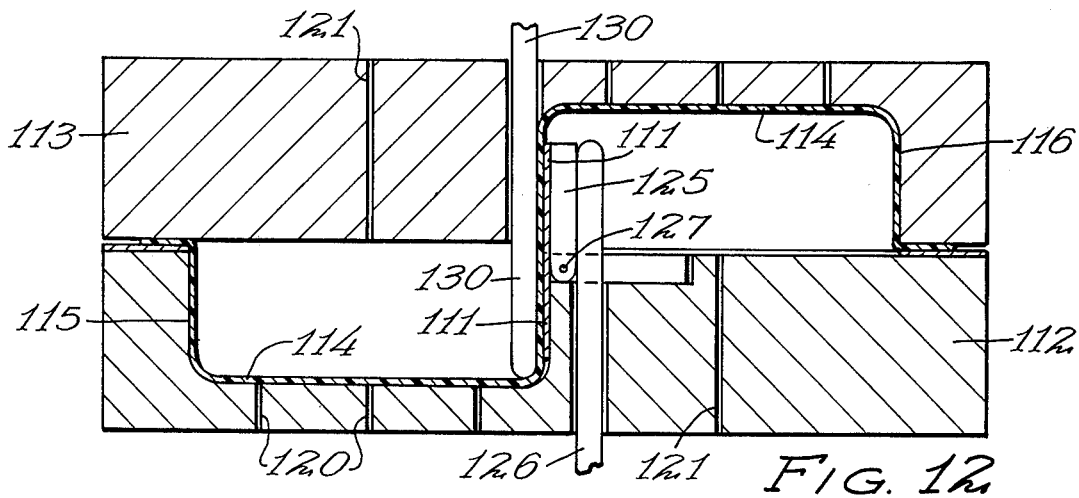
FIG. 12 is a schematic illustration of a sectional elevational view of a packaging card blank having two windows and the apparatus of FIG. 11 shown in the final forming position.

FIGS. 11 and 12 illustrate a modification of the embodiments shown in FIGS. 8 through 10 in that a plug assist means 130 is shown in position to perform much the same function as the plug assist means 30 illustrated and described in FIGS. 4 through 7. In other words, it may be found that in order to insure proper final positioning of the plastic film 114 and rotatable platform section 111 within the lower pocket-forming region 115, the application of mechanical force may be required. Further, as previously described, if bonding between the plastic film and the rotatable platform section 111 by the use of a thermo-plastic coating is desired then selective application of heat may be necessary as well as close contact during the forming process to assure proper fusion of the coating. It should be understood, however, that the essential operation and substance of the invention is not changed by minor variations in the equipment or processes employed.

Figure 13:
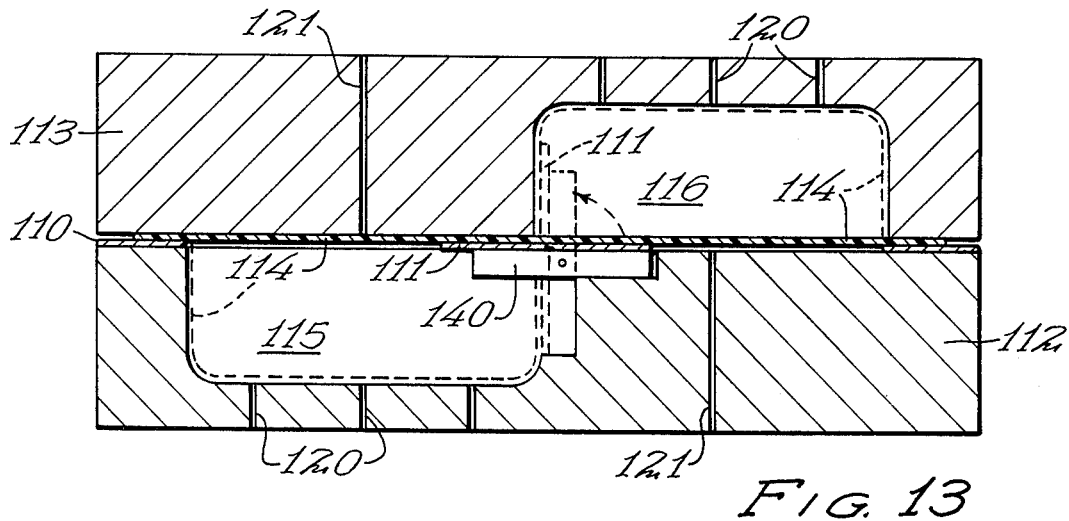
FIG. 13 is a schematic illustration of a sectional elevational view of apparatus featuring an alternative embodiment of the apparatus shown in FIGS. 8 and 11.

To illustrate that point, FIG. 13 shows an alternate form of rotatable platform support member designated as 140 which might be desirable for use where the rotatable platform section 111 is to be made from a relatively weak variety of sheet-like material. As can be seen in FIG. 13, the support member 140 underlies all or substantially all of the rotatable platform section 111. As the forces are applied to the plastic film 114 and the plastic film is moved into final conforming relationship with the upper and lower pocket-forming regions 116 and 115 respectively, as shown by dashed lines in FIG. 13, the forces exerted on the film are transmitted to the rotatable platform section 111. The support member 140, which is free to rotate, moves therewith and insures that no damage by bending or kinking will occur to the rotatable platform section 111.

Figure 14:
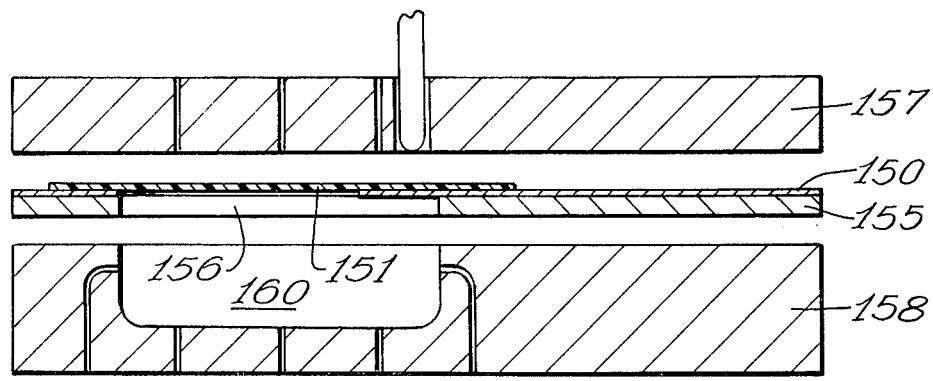
FIG. 14 is a schematic illustration of a sectional elevational view of apparatus featuring an alternative embodiment of the apparatus shown in FIGS. 4 through 7.
Figure 15:
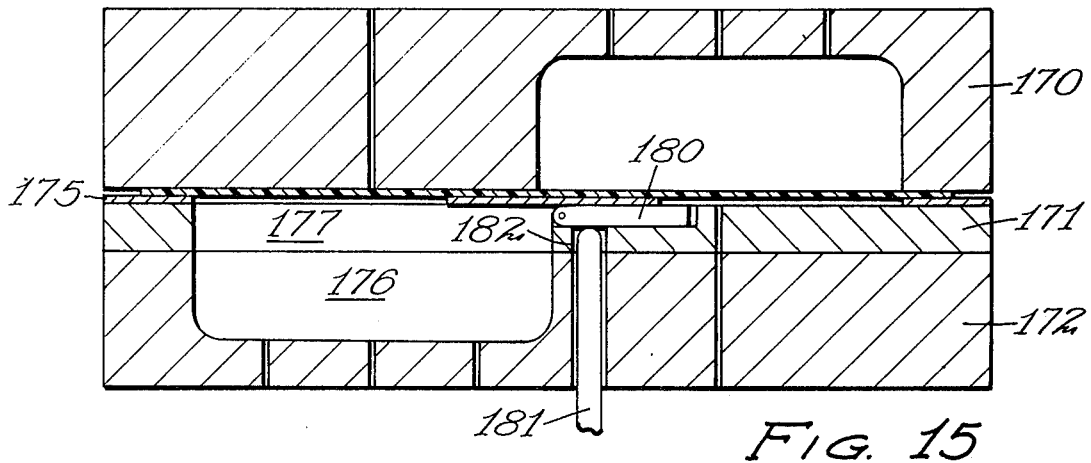
FIG. 15 is a schematic illustration of a sectional elevational view of apparatus featuring an alternative embodiment of the apparatus shown in FIGS. 8 through 10.
Figure 16:
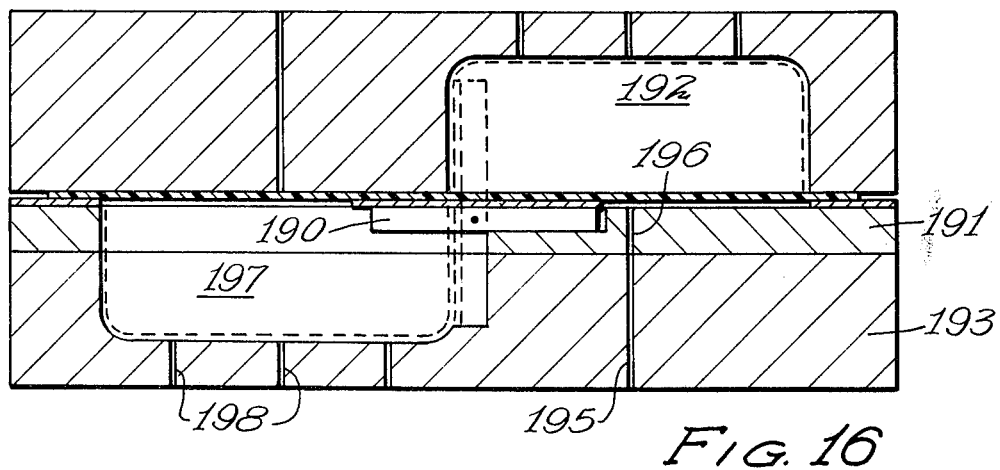
FIG. 16 is a schematic illustration of a sectional elevational view of apparatus featuring an alternative embodiment of the apparatus shown in FIG. 13.

As previously mentioned, this invention may be adapted for use on different types of commercially available packaging equipment. FIGS. 14, 15 and 16 illustrate different embodiments of apparatus similar to that which has been previously described, but which would be adapted for use with packaging systems employing a carrier plate disposed intermediate to the two basic platens found on all equipment. Such a system might be the model RT 72 carousel system as produced by the Impak Systems Division of United Shoe Machinery Corporation.

The apparatus shown in FIG. 14 is similar to the apparatus previously described in FIGS. 4 through 7, and would be used to fabricate containers from single opening blanks such as that described in FIGS. 4 through 7. As can be seen in FIG. 14 the card blank 150 with the plastic film 151 covering the window opening therein is disposed above a first platen or carrier platen 155 which serves to locate the card blank 150 at the processing station as shown in FIG. 14 and also to carry it to other processing positions on the equipment such as loading and sealing. The carrier platen 155 has formed therein an opening shown as 156 which is located directly adjacent to and beneath the window opening in the card blank 150. In operation of the apparatus as shown in FIG. 14, once the card blank 150 and carrier platen 155 are in position between the upper platen 157 and pocket-forming region holder 158 the three sections are brought together and the processing operation is carried out in essentially the same manner as that shown in FIGS. 4 through 7. The pocket-forming region holder 158 has formed therein the lower portion of a pocket-forming region designated as 160 which is located adjacent to the opening in the carrier platen 155 which is used to support the card blank 150. After the pocket is formed in the film 151, the segments are separated and the carrier platen 155 moves the formed container to another processing station for removal or for article loading and sealing which may be followed by a heat shrinking cycle for the plastic film 151.

FIG. 15 illustrates this application to a card blank having two window openings similar to that shown in FIGS. 8, 9 and 10. In FIG. 15 the upper platen designated as 170, the carrier platen designated as 171, and the pocket-forming region holder designated as 172 are shown in closed position about the card blank 175. The pocket-forming region holder 172 similarly has a pocket-forming region shown as 176 positioned adjacent to the opening in the carrier platen 171 which is designated as 177 and which is disposed directly beneath the window opening in the card blank 175. While the operation of the apparatus shown in FIG. 15 is similar to that which has been previously described in FIGS. 8, 9 and 10, it should be noted that in FIG. 15 the rotatable platform support member designated as 180 is formed within the carrier platen 171, and any means for rotating the support member 180 which is designated in FIG. 15 as 181 would most probably be located within the pocket-forming region holder 172 and extend upward therethrough to contact the rotating support platform 180 through an opening in the carrier platen 171 shown at 182. If the equipment which was employed, therefore, had a plurality of carrier platens 171 mounted in a carousel arrangement and adapted to rotate into and out of a forming position which would be substantially as shown in FIG. 15 each of the carrier platen positions would require a rotatable support member to be formed therein or combinations including plug assist means such as that shown in FIGS. 11 and 12. It can be seen that after the carrier platen 171 and top and bottom members are brought together in the forming position the actual processing is similar to that which has been previously described.

The final embodiment shown in FIG. 16 illustrates how a full size rotatable platform support member shown as 190 similar to the member 140 in FIG. 13 might be adapted for use with the carrier platen system. Again, as in FIG. 15, the rotatable platform support member 190 would be integral with and carried by the carrier platen shown in FIG. 16 as 191. The operation of the rotatable platform support member 190, however, would be similar to that described in FIG. 13. It should be noted that any positive air vents which are to be used in formation of the upper pocket-forming region shown in FIG. 16 as 192 must extend not only through the lower pocket-forming region holder 193 but also through the carrier platen 191. Aligning air vents designated as 195 and 196 respectively must therefore, be employed as shown in FIG. 16. Any vacuum ducts for the lower pocket-forming region 197 would be formed in the lower pocket-forming region holder 193. These ducts are designated as 198 in FIG. 16.

Figure 17:
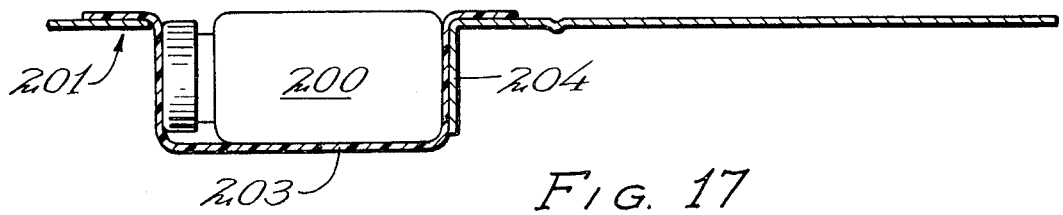
FIG. 17 is a schematic sectional elevational view of a single pocket container after processing showing an article therein and prior to sealing.
Figure 18:
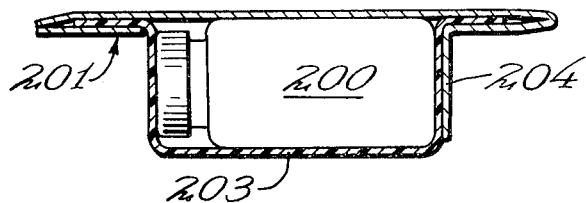
FIG. 18 is a schematic view of the container and article of FIG. 17 after sealing the package.

FIGS. 17 and 18 illustrate the loading of an article 200 into a finished single pocket container shown generally as 201. The article 200 is simply dropped into the window pocket, and then the back of the package may be sealed by either folding over a portion of the blank 201 and sealing it into the configuration shown in FIG. 18 by any conventional means such as stapling, gluing or fusing a thermo-plastic coating, or a second and separate sheet-like material may be attached to the back of the package to form the final sealed unit. As shown in FIGS. 17 and 18, the article is then visible through the plastic film 203 and the support platform 204 is in position to receive product identification codes or other information, or, when the rotatable platform support section 204 is located at the bottom of the package, it would also provide physical support to help the package stand upright.

Figure 19:
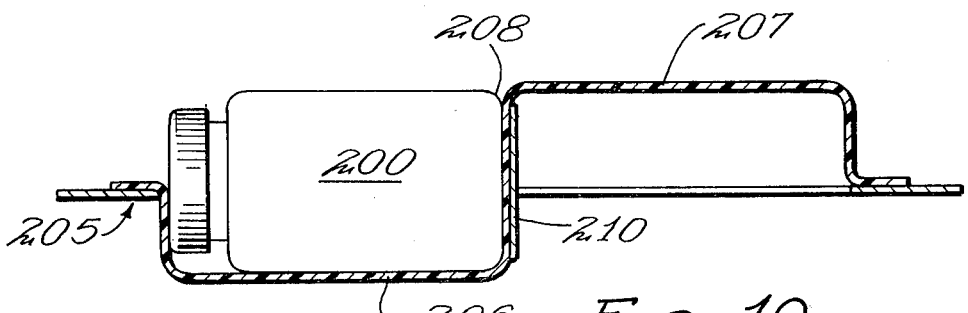
FIG. 19 is a schematic sectional elevational view of a double pocket container after processing.
Figure 20:
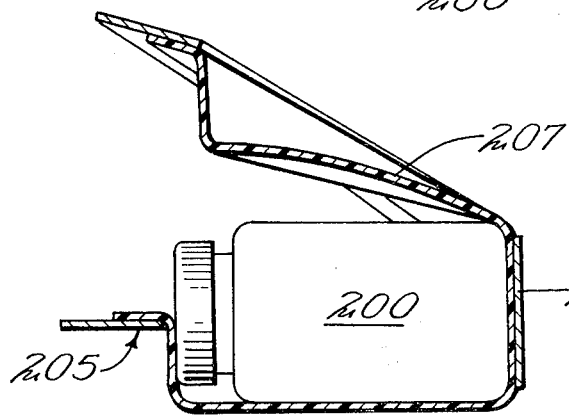
FIG. 20 is a schematic view of the container shown in FIG. 19 with an article therein partly folded into final configuration prior to sealing.
Figure 21:
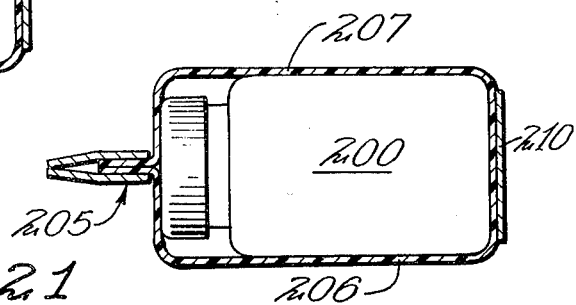
FIG. 21 shows a completed, sealed package.

FIGS. 19, 20 and 21 illustrate the folding and closing of a package using a two-window type container blank shown as 205. Again, an article 200 is placed in the lower pocket formed by the plastic film 206 and the upper pocket shown generally as 207 is then folded by bending around the corner of the container shown as 208 into position with the rest of the container 205. It should be noted that the plastic film will invert itself during the folding process to give a final configuration such as that shown in FIG. 21. The container as shown in FIG. 1 with the article 200 therein is then sealed and as can be seen, provides a support platform 210 on the bottom thereof.

In accordance with the Patent Statues, I have described the principles of construction and operation of my improvement in PROCESS AND APPARATUS FOR FORMING VISUAL DISPLAY PACKAGES; and while I have endeavored to set forth the best embodiment thereof, I desire to have it understood that obvious changes may be made within the scope of the following claims without departing from the spirit of my invention.

I claim:

1. The method of forming a visual display container from a foldable packaging card blank having two window openings formed therein, said window openings disposed on either side of a rotatable platform section formed in said card blank and positioned within said card blank adjacent to a transverse fold line, said platform section being adapted to become an exterior portion of said container, and having a plastic film spanning said window openings and said platform section, which comprises the steps of:

locating at least one of said card blanks on a first platen having formed therein an opening of size and shape conforming to a first of said window openings in said card blank, and located adjacent thereto on one side of said card blank;

moving a second platen into registry with said first platen and the other side of said card blank, said second platen having formed therein an opening of size and shape similar to the second of said window openings in said card blank, and located adjacent thereto;

forming a recess pocket in said plastic film extending through each of said window openings in said card blank into said respective openings in said first and second platens and into conforming shape with a pocket-forming region located adjacent to said openings in said first platen and said second platen; and rotating said rotatable platform section in said card blank into position on the exterior of the recessed pocket formed in said film through said first window opening in said card blank.

2. The method of claim 1 including the step of heating said plastic film prior to forming said recessed pockets in said film.

3. The method of claim 1 including the step of supporting the underside of said rotatable platform section initially in contact with said first platen over at least that portion of said rotatable platform section underlying said second window opening in said card blank.

4. The method of claim 1 wherein the step of forming a recessed pocket in said plastic film includes the steps of:

creating a substantially air tight seal around said window opening in said card blank; and creating a vacuum in said pocket-forming regions to draw said plastic film through said window openings in said card blank and said opening in said first and said second platens and into conforming shape with said pocket-forming regions in each of said platens.

5. The method of claim 1 wherein said platform section has a portion thereof coated with a thermo-plastic coating, and including the step of bonding a portion of said plastic film to a contiguous portion of said rotatable platform section coated with said thermo-plastic coating.

6. The method of claim 5 including the step of bonding said film to said rotatable platform section by pressing a portion of said film into contact with a portion of said rotatable platform section and heating said portion of said film to said section to obtain a fusion bond between said film and said coating.

7. The method of claim 1 wherein said film is an ionomer film and including the step of bonding a portion of said ionomer film to said rotatable platform section by pressing a portion of said ionomer film into contact with a contiguous portion of said rotatable platform section and heating said portion of said ionomer film and said rotatable platform section to obtain a fusion bond therebetween.

* * * * *